United States Patent [19]
Omo et al.

[11] Patent Number: 6,062,673
[45] Date of Patent: May 16, 2000

[54] RECORDING APPARATUS AND RECORD DATA PROCESSING METHOD

[75] Inventors: Shinichi Omo, Kawasaki; Hiroshi Fukui, Yokosuka; Akira Kuronuma, Kawasaki; Takayuki Murata, Kawasaki; Masahiko Umezawa, Kawasaki, all of Japan

[73] Assignee: Canon Kabushiki Kaisha, Tokyo, Japan

[21] Appl. No.: 08/740,220

[22] Filed: Oct. 25, 1996

[30] Foreign Application Priority Data

Oct. 26, 1995 [JP] Japan ................................ 7-279053

[51] Int. Cl.$^7$ .......................... B41J 2/145; B41J 19/00; H04N 1/21; H04N 1/23
[52] U.S. Cl. .......................... 347/40; 395/109; 358/298
[58] Field of Search ........................ 347/40, 42; 358/456, 358/459, 465, 451, 298, 458; 395/109, 110

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,698,691 | 10/1987 | Suzuki et al. | 358/283 |
| 4,723,129 | 2/1988 | Endo et al. | 347/56 |
| 4,740,796 | 4/1988 | Endo et al. | 347/56 |
| 5,617,130 | 4/1997 | Uchiyama et al. | 347/131 |
| 5,642,474 | 6/1997 | Parkhurst et al. | 395/117 |
| 5,650,858 | 7/1997 | Lund | 358/298 |

FOREIGN PATENT DOCUMENTS

| | | |
|---|---|---|
| 59-123670 | 7/1984 | Japan . |
| 59-138461 | 8/1984 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

The present invention relates to a recording apparatus that includes a recording head capable of performing dot recording, a main scanner for scanning the recording head, and a data storage for storing data sent from a host computer. The apparatus can make a record according to stored data by performing a plurality of main scans, and further comprises a restorer for restoring data, which has been subjected to given processing by the host computer, to another data in line with the given processing. The present invention further relates to a record data processing method. According to the present invention, an amount of sent data to be held can be reduced by reducing an amount of data to be transferred from the host computer. Moreover, a record with irregular concentration suppressed can be made in substantially the same recording area by performing a plurality of rounds of main scan as conventionally, while a reduction in cost can be achieved.

14 Claims, 7 Drawing Sheets

RECORDING APPARATUS AND RECORD DATA PROCESSING METHOD

BACKGROUND OF THE INVENTION

1. Field of the Invention

The present invention relates to a recording apparatus and its record data processing method. More particularly, this invention is concerned with a recording apparatus and its record data processing method in which recording is carried out according to record data such as images or text transferred from a host computer.

2. Description of the Related Art

Various types of serial recording apparatuses in which recording is carried out according to record data transferred from a host computer have widely prevailed in the past. Above all, a dot-matrix recording apparatus is an apparatus for forming a desired record image on a recording material or recording sheet by alternately performing shift in main scan directions of a carriage having a recording head capable of performing dot recording and sheet feed in sub-scan directions, which are orthogonal to the main scan directions, of the recording sheet. Since high-density and relatively high-speed recording can be achieved at low cost, the dot-matrix recording apparatus has been widely adopted in various fields.

In such a serial recording apparatus, when a given number of recording elements (ink-jet ports or electrothermal converting elements forming ink-jet elements in the case of an ink-jet recording apparatus) (equivalent to, for example, 64 dots) are set in array in the sub-scan direction in the recording head, irregularity may occur in recording concentration because of a manufacturing error of each recording element with respect to the other recording elements.

For suppressing such irregular concentration, the following sequence has been repeated in the past: for example, alternate ones of the recording elements set in the array are used for dot recording during a first main scan; sheet feed is performed by a magnitude that is nearly a half of that of a previous sheet feed; and then remaining dot recording is carried out using unused recording elements.

However, according to the foregoing prior art, on the assumption that the whole dot recording is accomplished during one main scan as it previously is, record data is sent from a host computer to a recording apparatus. Nevertheless, the recording apparatus holds the record data so that a record of an intended dot density can be obtained by performing a plurality of main scans, for example, in the foregoing example, by performing two main scans. During each round of main scan, record data is transferred for dot locations at which no dot will be recorded. In the case of a recording apparatus requested to provide especially high resolution, an amount of data becomes duly larger. It is therefore requested to transfer record data at a high speed.

Moreover, the recording apparatus to which record data is transferred needs a print buffer for storing the record data. The necessity of a large-capacity print buffer becomes one factor of an increase in cost.

SUMMARY OF THE INVENTION

An object of the present invention is to provide a recording apparatus and its record data processing method capable of reducing an amount of data to be transferred from a host computer to the recording apparatus, suppressing irregular concentration, and achieving a reduction in cost.

Another object of the present invention is to provide a record data processing method for a recording apparatus for forming a record image based on record data transferred from a host computer by performing a plurality of main scans within a substantially same recording area using a recording head for performing dot recording. The method includes the steps of dividing the record data into divided record data for use during the plurality of main scans for recording, subjecting the divided record data to a predetermined processing for transfer to form divided processed data, restoring the divided processed data to form divided restored data, and supplying the divided restored data to the recording head. The predetermined processing for transfer comprises masking using mask patterns each comprised of a dot validation mask for validating dot recording and a dot invalidation mask for invalidating dot recording. The restoring step comprises processing for restoring the divided processed data to form the divided restored data similar to the divided record data for use during the main scans for recording by employing templates matching the mask patterns.

A further aspect of the present invention is to provide a recording apparatus for use with a recording head having a recording element array for performing dot recording on a recording medium. The apparatus includes main scan means for scanning the recording head in a main scan direction transverse to a direction of the recording element array, data storage means for storing divided processed data sent from a host computer for recording, restoration means for restoring the divided processed data stored in the storage means, the divided processed data having been divided into divided record data by the host computer and subjected by the host computer to a predetermined processing for transfer, into divided restored data for use in recording, and control means for controlling recording in a substantially same recording area of the recording medium according to the divided restored data by effecting a plurality of main scans. The predetermined processing for transfer comprises masking using mask patterns each comprised of a dot validation mask for validating dot recording and a dot invalidation mask for invalidating dot recording. The restoration means processes the divided processed data to divided restored data for use during the plurality of main scans for recording by employing templates matching the mask patterns.

According to the recording apparatus and record data processing method of the present invention, processed data that has been divided into data items and subjected to given processing for transfer by means of the host computer is sent to the recording apparatus and stored therein during the respective main scans, so that a record image can be formed within substantially the same recording area by performing a plurality of main scans. The recording apparatus performs restoration on the processed data in line with the given processing, and sends resultant data to the recording head. An amount of data to be held in the recording apparatus is therefore small. Moreover, a high-density record image can be produced with occurrence of irregularity suppressed.

DESCRIPTION OF THE PREFERRED EMBODIMENTS

Embodiments of the present invention will be described in detail and in practical fashion on the basis of the drawings below.

Figure 5:
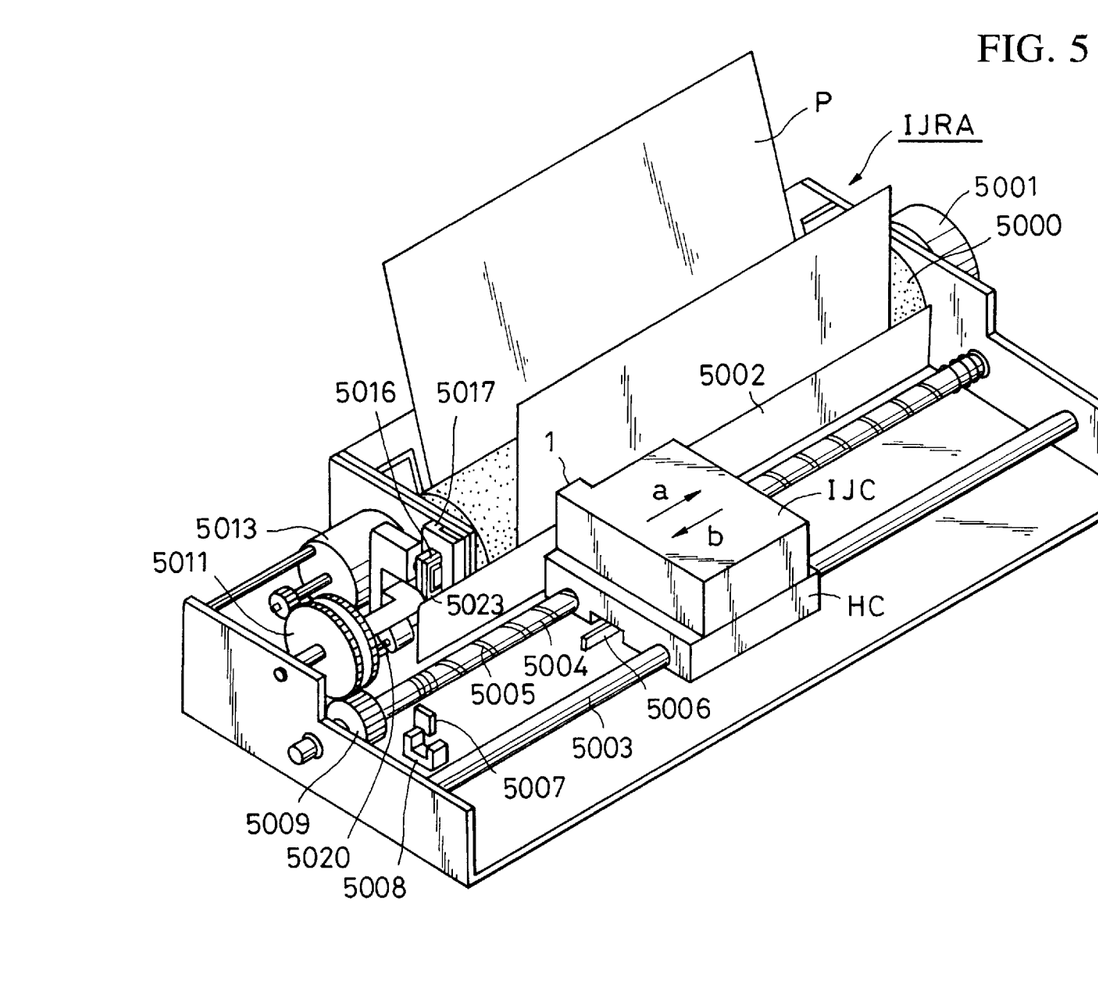
FIG. 5 is an oblique view showing an example of the configuration of an ink-jet recording apparatus to which the present invention can be applied.

FIG. 5 shows an example of the configuration of a serial recording apparatus IJRA of an ink-jet type to which the present invention can be applied.

In FIG. 5, there are shown an ink-jet cartridge IJC having an ink tank and an ink-jet recording head 1 in one united body and being mounted on a carriage HC, a platen 5000 for holding a recording sheet of paper P at a recording position and performing sheet feed to feed the sheet P, a sheet feed motor 5001, a sheet presser 5002 for pressing the sheet P toward the platen 5000, and a guide shaft 5003 and lead screw 5004 for moving the carriage HC over the recording sheet P. A screw thread 5005 is formed on the lead screw 5004. When an engagement pin in the carriage HC which is not shown is engaged with the screw thread 5005, the carriage HC is moved in main scan directions of arrows a and b with the rotation of the lead screw 5004.

Also shown are a blocking-off projection 5006 jutting out from the carriage HC, a stopper 5007, a sensor 5008 for detecting a home position of the carriage HC by sensing blocking-off performed by the blocking-off projection 5006, and gears 5009 and 5011 to be driven by a driving motor 5013. During recording, the lead screw 5004 is driven via the gears 5009 and 5011 according to given timing, and the recording head 1 is allowed to scan together with the carriage HC. Ink is then jetted from the recording head 1. Thus, a record is made on the recording sheet P. A cap member 5016 and cleaning member 5017 are involved in recovery that is performed on the recording head 1 when the carriage HC is located in the vicinity of the home position.

A plurality of ink-jet ports are set in array at a given density in a direction orthogonal to moving directions of the carriage HC on an ink-jet port side of the ink-jet recording head 1 opposed to the recording sheet P.

In the first embodiment, alternate ones of the thus-arranged ink-jet ports are retained in a jet-enabled state, and a record is completed by repeatedly performing the aforesaid sequence on the same recording area during two rounds of scan. Record data to be sent from the host computer, and record data processing steps to be followed by the recording apparatus that has received the record data will be described in conjunction with FIGS. 1 and 2.

Figure 1:
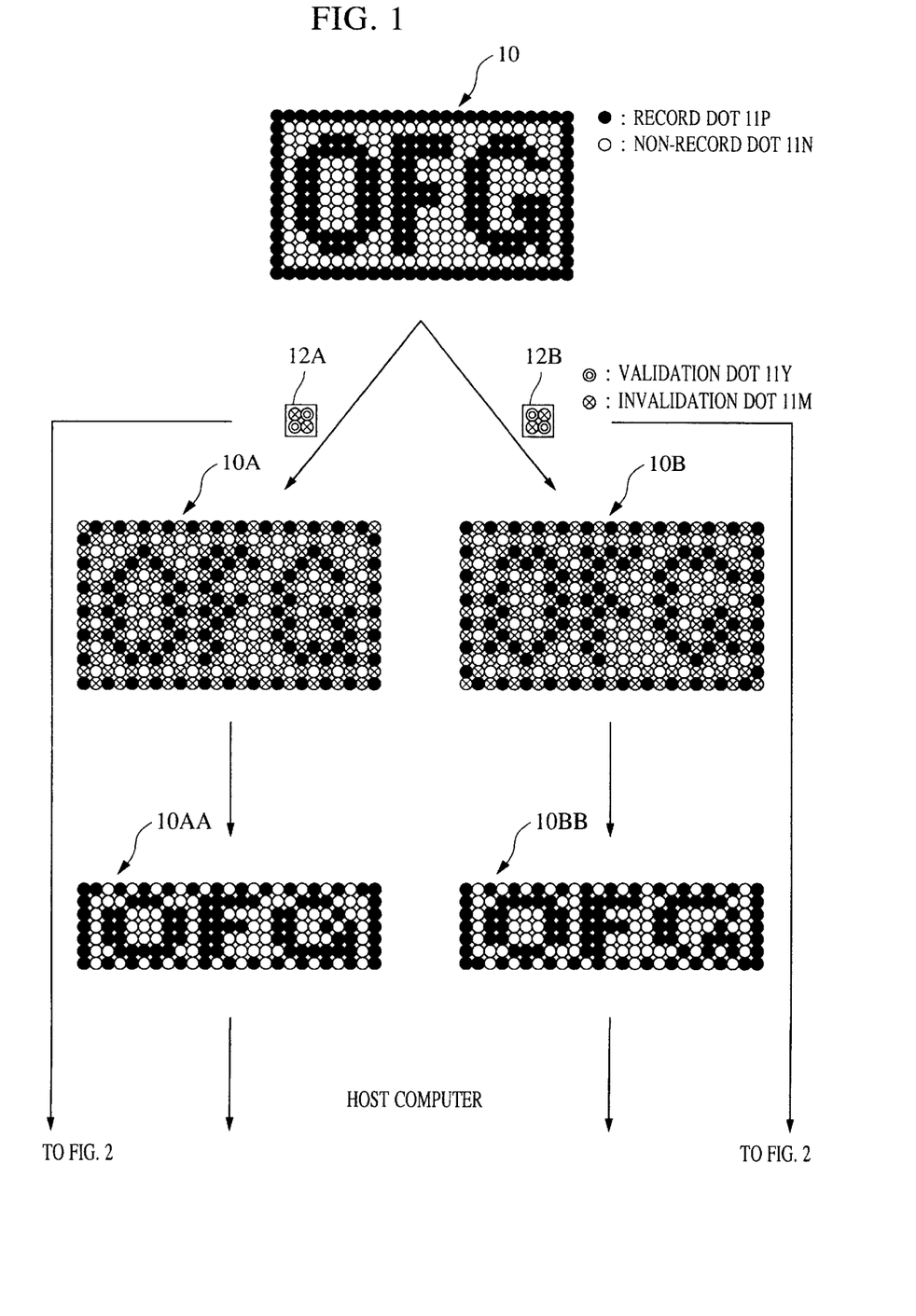
FIG. 1 is an explanatory diagram of a record data processing procedure to be performed by a host computer in accordance with the first embodiment of the present invention.

In FIG. 1, there are shown record data 10 represented by dots, dots 11P that are indicated with black circles and that are dots recorded by jetting ink (hereinafter referred to as record dots) among the representing dots, and dots 11N that are indicated with white circles and that are dots for which ink is not ejected and which are therefore not actually recorded (hereinafter referred to as non-record dots). A record image to be recorded on the basis of the record data is letters OFG encircled with a rectangular frame. Hereinafter, a longitudinal direction of the record data, that is, a direction in which the ink-jet ports are set in array shall be regarded as a column direction. A lateral direction thereof, that is, a main scan direction of the recording head 1 by the carriage HC shall be regarded as a row direction. In this embodiment, the record data 10 is divided into data items 10A and 10B, and sent from a host computer to the recording apparatus IJRA separately twice. Based on the sent data, the recording apparatus IJRA forms a dot record image like the one 10 by performing two main scans. Data processing performed at this time will be described below.

Figure 2:
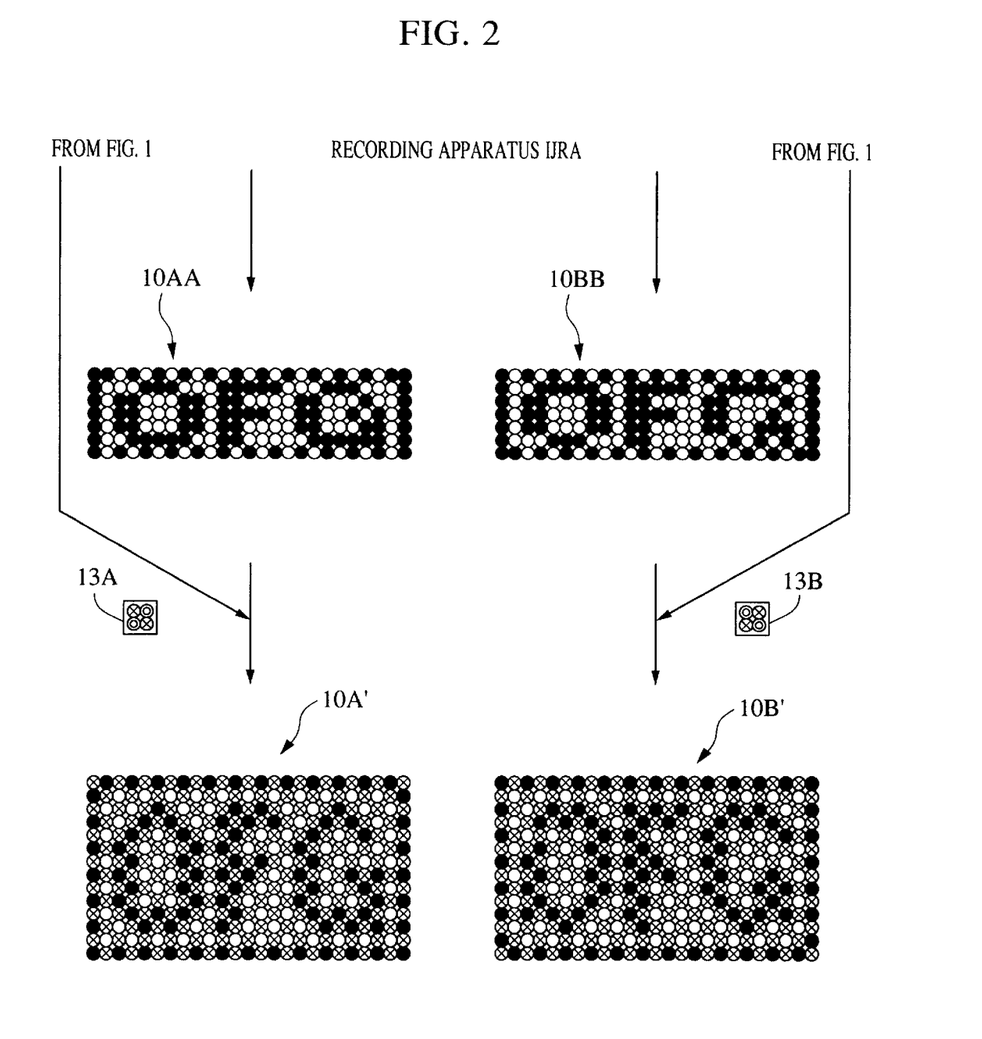
FIG. 2 is an explanatory diagram of a record data processing procedure to be performed by a recording apparatus in accordance with the first embodiment of the present invention.

In FIG. 1, there are shown resultant data items 10A, 10B, 10AA, and 10BB resulting from data processing performed by the host computer. In FIG. 2, there are shown resultant data items 10AA, 10BB, 10A', and 10B' resulting from data processing performed by the recording apparatus IJRA. Also shown are mask patterns 12A and 12B each of which is a 2-by-2 matrix in this embodiment. A double-circle indicates a location of a record dot lip or non-record dot 11A that is not to be masked but is to be validated. A dot at the location shall be referred to as a validation dot Y. A circle encircling a cross indicates a location of a dot which is to be masked and of which recording is to be inhibited, that is, a dot which is to be invalidated. A dot at the location shall be called an invalidation dot 11M. Furthermore, the right-hand ones of the resultant data items 10A, 10B, 10AA, and 10BB in FIG. 1 and those of the resultant data items 10AA, 10BB, 10A', and 10B' in FIG. 2 are resultant data items resulting from the first main scan, while the left-hand ones thereof are resultant data items resulting from the second main scan.

First, the host computer uses the mask pattern 12A to process the record data 10 and to thus produce data to be sent for the first main scan. Thus, process data 10A shown in FIG. 1 is produced. Masking performed on the record data 10 is masking for making it possible to specify dots 11M, 11Y, 11M, 11Y, etc. in that order from the top of the first column and to specify dots 11Y, 11M, 11Y, 11M, etc. in that order from the top of the second column. The same data processing is repeated for the subsequent third column, fourth column, etc. Invalidation dots are then deleted from the resultant process data 10A, thus producing the sending processed data 10AA. The sending processed data 10AA is then transferred to the recording apparatus IJRA. The thus-received processed data 10AA has the same contents as the sent processed data 10AA.

In FIG. 2, there are shown patterns (hereinafter templates) 13A and 13B used to restore data in the recording apparatus IJRA. The templates 13A and 13B are identical to the mask patterns 12A and 12B. On receipt of the data 10AA, the recording apparatus IJRA appends each of the invalidation dots 11M to each pair of dots in the data 10AA, and restores the data 10AA to data 10A' shown in FIG. 2 using the template 13A according to the same procedure as that employed in the host computer.

Likewise, for the second main scan, the host computer uses the mask pattern 12B to perform data processing and to thus produce data 10B and 10BB. The sending processed data 10BB is sent to the recording apparatus IJRA. The recording apparatus IJRA uses the template 13B to restore the data 10BB to data 10B' shown in FIG. 2.

Figure 3:
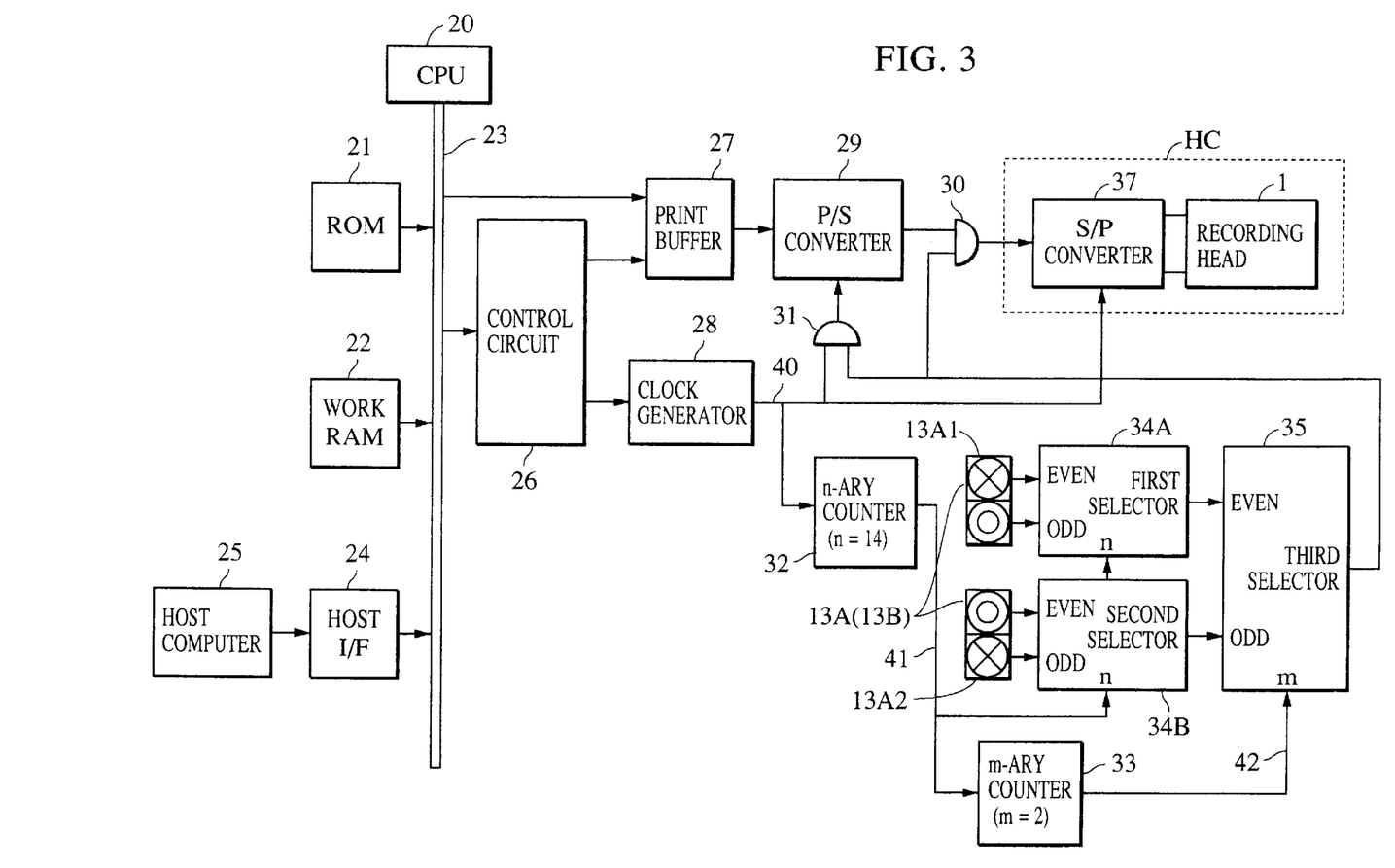
FIG. 3 is a block diagram showing an example of the circuitry for record data processing in accordance with the present invention.

FIG. 3 shows an example of the configuration of a control circuit used to implement record data processing in accordance with the present invention. In FIG. 3, there is shown a control unit 20 for controlling the whole recording apparatus IJRA. The control unit 20 has the capability of a CPU and controls the components of the recording apparatus IJRA according to various kinds of recording-related control programs that are stored in a ROM 21. Also shown are a work RAM 22 for storing information other than image data, a common bus 23, and a host interface 24 for sending record data from a host computer 25 to the recording apparatus IJRA. Moreover, there are shown a control circuit 26 for executing record data processing in accordance with the present invention, and a print buffer 27 for temporarily storing data (processed data 10AA or 10BB shown in FIG. 1) sent from the host computer 25 for each main scan.

Figure 4A:
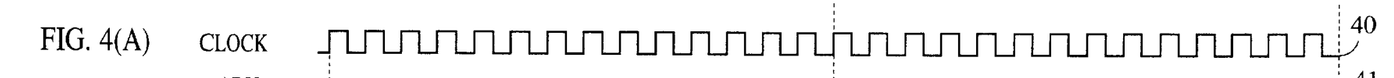
FIGS. 4(A)–4(G) comprise an explanatory diagram showing steps of data processing in accordance with the present invention.

Also shown are a clock generator 28 for generating a transfer clock that is a clock 40 shown in FIG. 4A, a parallel-serial (P/S) converter 29 for converting the processed data 10AA or 10BB that is formatted column by column and stored in the print buffer 27 into serial data to be sent to the recording head 1, and AND gates 30 and 31, one of which receives record data (image data 10A' or 10B' in FIG. 2) reproduced by a circuit to be described later through an input terminal thereof.

Referring to FIGS. 4(A)–4(G), a circuit for reproducing the processed data 10AA sent from the host computer 25 in FIG. 3 will be described.

In FIG. 3, there is shown an n-ary counter 32 (in this example, n equals to 14 since 14 dots are recorded per column). The n-ary counter 32 updates a count value at time instants at which pulses of the transfer clock 40 associated with dots on each column (in this example, time instants associated with 14 dots of dots 0, 1, 2, . . . , 9, A, B, C, and D), and causes an m-ary counter 33 to count up by one. The n-ary counter 32 then outputs a signal 41 to a first selector 34A so that for the first column, a first-column restoration mask 13A1 of the template 13A will be used with the dot locations thereof unchanged and associated with the time instants at which pulses of the transfer clock 40 are counted (See FIG. 4E). FIG. 4C indicates a state in which the m-ary counter 33 counts up one by one, and reference numeral 42 denotes a signal to be output every time the m-ary counter 33 counts up by one (hereinafter referred to as a column change signal). Likewise, for the second column of processed data transferred to the recording apparatus IJRA, a second selector 34B is forced to use a second-column restoration mask 13A2 of the template 13A with the dot locations of the mask 13A2 unchanged and associated with the time instants at which pulses of the transfer clock 40 are counted.

There is shown a third selector 35. The third selector 35 selects the first selector 34A or second selector 34B according to the even or odd value represented by the column change signal 42 sent from the m-ary counter 33, receives a signal that has been corrected using a mask from either of the selectors, and outputs the signal to the AND gates 30 and 31. The AND gate 31 permits or inhibits supply of the transfer clock 40 according to the output of the third selector 35. By contrast, the first selector 34A selects an invalidation dot when the signal sent from the n-ary counter 32 represents an even value, and selects a validation dot when the signal represents an odd value. In other words, the AND gate 31 permits supply of the signal 40 to the P/S converter 29 only when the first selector 34A or second selector 34B has used the invalidation dot 11M. By contrast, the AND gate 30 permits or inhibits supply of record data from the P/S converter 29 to a serial-parallel (S/P) converter 37 in the same manner as the AND gate 31 does.

Figure 4B:
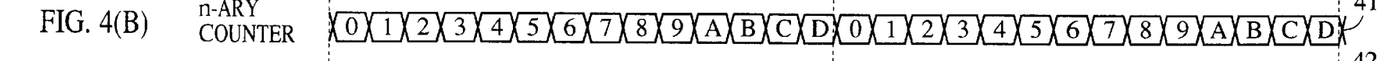
Figure 4C:
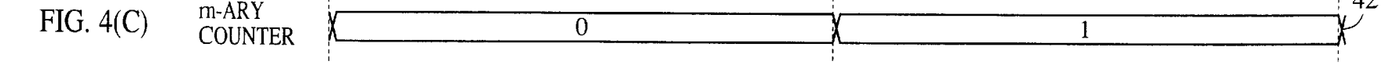
Figure 4D:
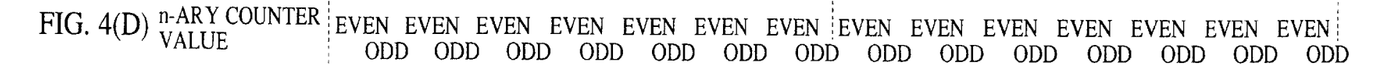
Figure 4E:
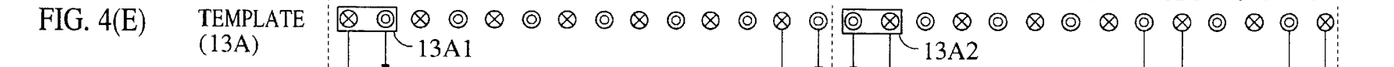
Figure 4F:
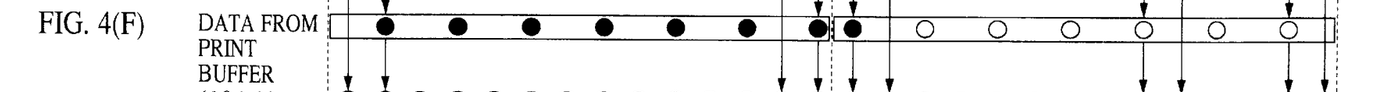
Figure 4G:
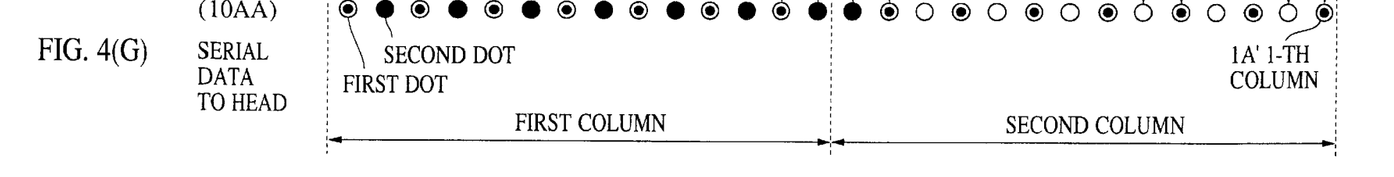

To be more specific, referring to FIG. 4, when a data signal is supplied from the print buffer 27 as shown in FIG. 4F, the column change signal represents an even value (0) and the first selector 34A is selected. In this state, for the first dot, since the n-ary counter value is even, a signal indicating the invalidation dot 11M is selected and sent to the third selector 35. A signal (black double-circle) for inhibiting dot recording is sent to the S/P converter 37 via the AND gates 30 and 31. For the second dot, since the n-ary counter value is odd, a selection signal indicating the invalidation dot 11Y is sent to the third selector 35. A record dot lip is therefore sent as a data signal to the S/P converter 37.

The S/P converter 37 performs shifting at every input of the data signal, whereby a serial data signal stream shown as FIG. 4F is produced. After the fourteenth dot data is transferred, recording of the first column is carried out by the recording head 1.

As for the second column of the processed data 10AA transferred to the recording apparatus IJRA (See FIG. 4F), the m-ary counter 33 and n-ary counter 32 are cleared, and the outputs thereof represent a 0 and 1 respectively as shown as FIGS. 4B and 4C. The same procedure as the one described above is repeated. Thus, restoration is repeated up to the twenty-fifth column in this embodiment. Eventually, the processed data 10AA is restored to the recording image data 10AA shown in FIG. 2. When the recording head 1 performs recording according to the image data 10A during the first main scan, the host computer 25 uses the mask pattern 12B to produce the processed data 10B and 10BB in the same manner as mentioned above, and transfers the processed data 10BB to the recording apparatus IJRA.

The recording apparatus IJRA restores the processed data 10BB to the recording image data 10B' shown in FIG. 2 according to the same procedure as the one described above, and records an image over an image formed during the first round of scan. The record image 10 composed of dots and shown in FIG. 1 is thus reproduced.

In the aforesaid embodiment, a 2-by-2 matrix (two columns each having two dots longitudinally) is used for the mask patterns 12A and 12B and the matching templates 13A and 13B. The dot array is not limited to this mode.

Instead of providing elements 34A, 34B, and 35 for selecting a template in the recording apparatus, a signal indicating a mask pattern to be employed may be transferred from the host computer 25 before or after each column data is sent. The signal may represent a pattern symbolized in advance, so that validation or invalidation of a dot can be selected according to the signal.

In the aforesaid embodiment, for a better understanding, data transfer and recording are performed alternately. In reality, if a print buffer or reception buffer can store data needed for a plurality of scans, the data transfer and recording need not always be performed alternately but can be performed continually for a higher recording speed.

Figure 6:
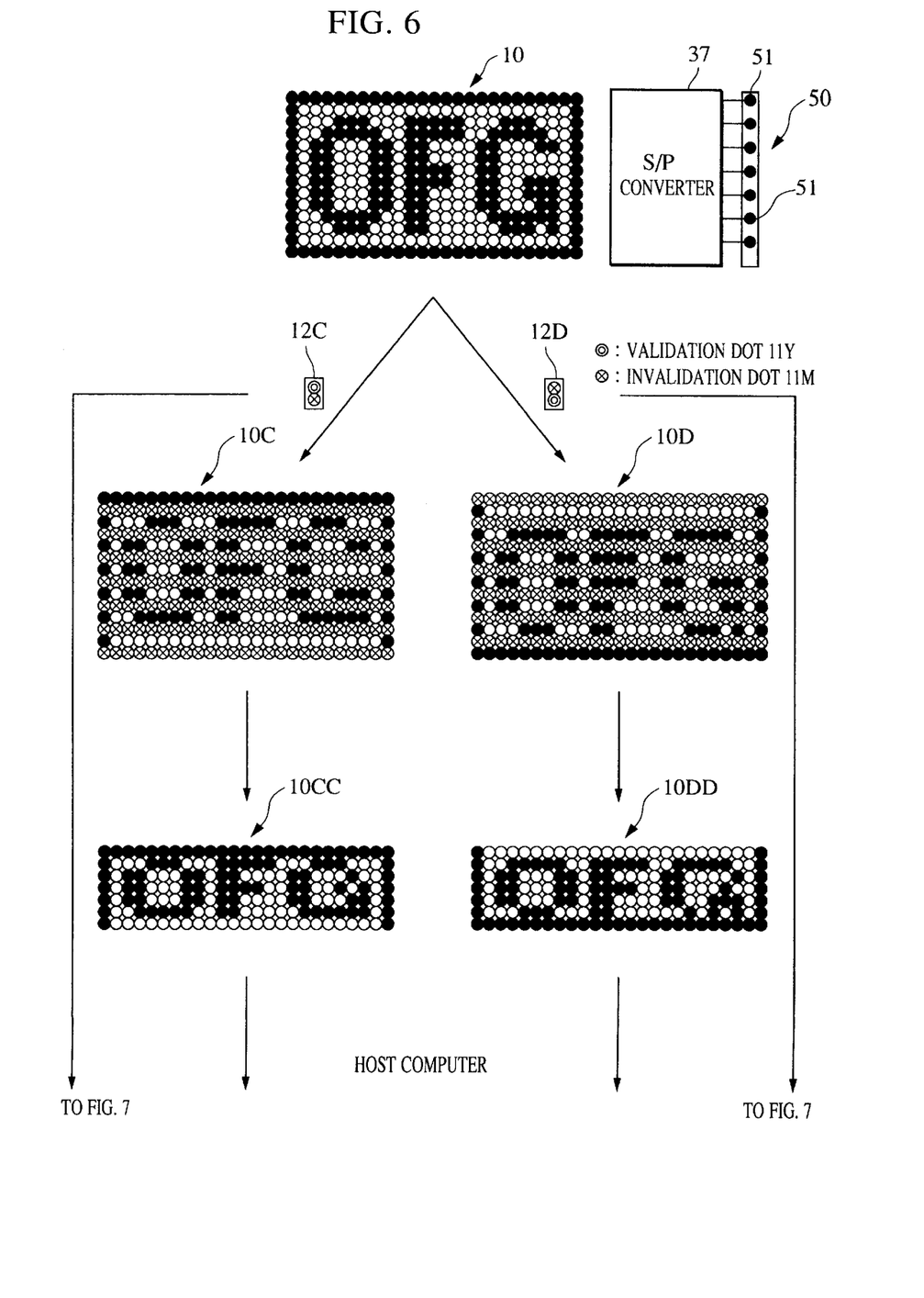
FIG. 6 is an explanatory diagram of a record data processing procedure to be performed by a host computer in accordance with the second embodiment of the present invention.

FIG. 6 shows record data processing in the second embodiment of the present invention. In FIG. 6, there is shown a recording head 50 of this embodiment. In the recording head 50 of this embodiment, for example, ink-jet ports 51 used for dot recording are set in array in a column direction so that they can be coincident with alternate ones of the dots of one column which determine resolution of a record image. A signal used to perform dot recording column by column is sent to jet energy generation elements (not shown) associated with the ink-jet ports 51 via the S/P converter 37 (See FIG. 3). Moreover, mask patterns 12C and 13D are designed according to the structure of the recording head of this embodiment, and restoration templates 13C and 13D match the mask patterns 12C and 12D.

Even in this embodiment, a record image is completed by performing two main scans. In FIG. 6, there are shown process data 10C used for the first main scan, and process data 10D used for the second main scan. That is to say, the data 10C is produced by masking record data 10 using the mask pattern 12C orderly from the first column. The data 10D is produced by masking the record data 10 using the mask pattern 12D in the same manner. Thereafter, invalidation dots 11M are deleted from the process data 10C and 10D, thus producing sending processed data 10CC and 10DD. The data 10CC is sent to the recording apparatus IJRA for the first scan, and the data 10DD is sent thereto for the second scan.

Figure 7:
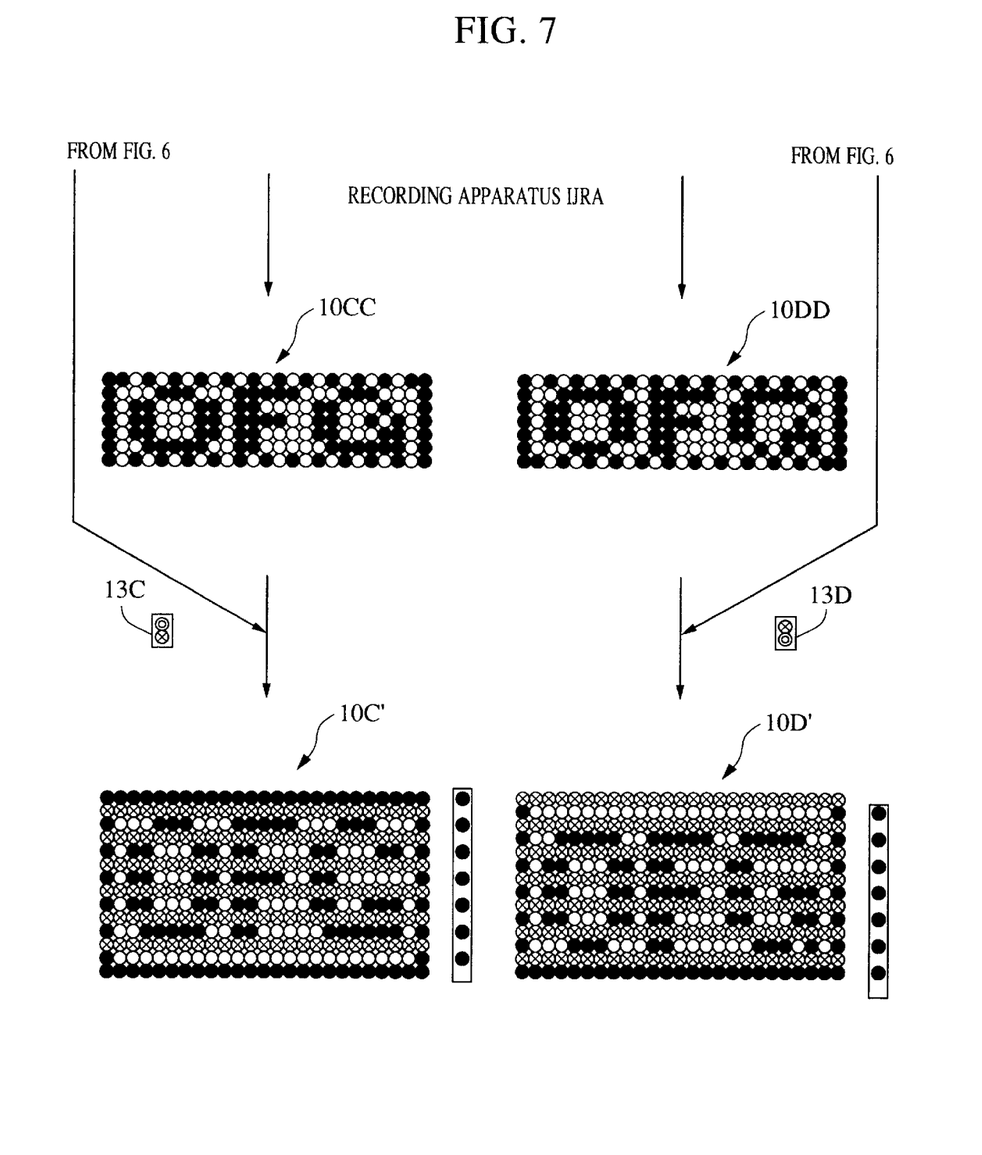
FIG. 7 is an explanatory diagram of a record data processing procedure to be performed by a recording apparatus in accordance with the second embodiment of the present invention.

The recording apparatus IJRA uses the template 13C for the data 10CC and restores the data 10CC to data 10C' shown in FIG. 7 column by column. For the data 10DD, the template 13D is used to restore the data 10DD to data 10D' column by column. However, for the first main scan, the recording head 50 is retained in a state shown in the left-hand part of FIG. 7 in order to record an image corresponding to the data 10C'. For the second scan, the recording head 50 is shifted by one dot in a column direction as shown in the right-hand part of FIG. 7. This kind of state is attained by performing sheet feed by one dot, that is, by feeding a recording sheet by one dot. Specifically, for the template 13C, recording is instructed to start with a leading position of an area succeeding to an area to be recorded during the first scan. For the template 13D, it is instructed to feed the recording sheet to a position one-dot next to the leading position. The recording head 50 retained in the above state is used to record an image corresponding to the data 10D'. Thus, by performing two main scans on substantially the same area, a perfect dot record image corresponding to the image data 10 in FIG. 6 can be produced. Even in this embodiment, recording is not carried out at locations of the invalidation dots 11M during recording based on the data 10C' or 10D'.

In the aforesaid embodiments, a serial ink-jet recording apparatus preferable for dot recording is taken as a recording apparatus for instance. The present invention is not limited to the ink-jet recording apparatus but can apply to any type of recording apparatus as long as the recording apparatus can perform dot recording and achieve dot recording relative to substantially the same area by performing two main scans. Mask patterns and templates to be employed should merely be designed to validate only the dots necessary for each main scan.

As described so far, according to the present invention, a recording apparatus has a restoration means for restoring processed data, which has been divided into data items needed by a host computer during respective main scans for recording and subjected to given processing for transfer, to data needed for the recording in line with the given processing. Given processed data alone to be used for recording during the respective main scans should merely be transferred from the host computer to the recording apparatus. An interface for fast processing need not be interposed between the host computer and recording apparatus. The capacity of a print buffer included in the recording apparatus may be a buffer of minimum necessary capacity. Thus, a recording apparatus and its record data processing method capable of producing a high-resolution image record at low cost can be provided.

Moreover, an amount of data to be processed by the recording apparatus may be small. This contributes to an increase in recording speed.

Among various ink jet recording systems, the present invention brings about a particular effect when applied to a recording head and an ink jet recording system utilizing thermal energy for ink discharge.

The principle and representative configuration of said system are disclosed, for example, in U.S. Pat. Nos. 4,723, 129 and 4,740,796. This system is applicable to so-called on-demand recording or continuous recording, but is particularly effective in the on-demand recording because, in response to the application of at least a drive signal representing the recording information to an electrothermal converter element positioned corresponding to a liquid channel or a sheet containing liquid (ink) therein, the element generates thermal energy capable of causing a rapid temperature increase exceeding the nucleate boiling point, thereby inducing film boiling on a heat action surface of the recording head and thus forming a bubble in the liquid (ink), in one-to-one correspondence with the drive signal. The liquid (ink) is discharged through a discharge opening by the growth and contraction of the bubble, thereby forming at least a liquid droplet. The drive signal is preferably formed as a pulse, as it realizes instantaneous growth and contraction of the bubble, thereby attaining highly responsive discharge of the liquid (ink). Such pulse-shaped drive signal is preferably that disclosed in U.S. Pat. Nos. 4,463,359 and 4,345,262. Also the conditions described in U.S. Pat. No. 4,313,124 relative to the temperature increase rate of the heat action surface allows to obtain further improved recording.

The configuration of the recording head is given by the combinations of the liquid discharge openings, liquid channels and electrothermal converter elements with linear or rectangular liquid channels, disclosed in the above-mentioned patents, but a configuration disclosed in U.S. Pat. No. 4,558,333 in which the heat action part is positioned in a flexed area, and a configuration disclosed in U.S. Pat. No. 4,459,600 also belong to the present invention. Furthermore, the present invention is effective in a structure disclosed in Japanese Patent Laid-open Application No. 59-123670, having a slit common to plural electrothermal converter elements as discharge opening therefor, or in a structure disclosed in Japanese Patent Laid-open Application No. 59-138461, having an aperture for absorbing the pressure wave of thermal energy, in correspondence with each discharge opening.

A full-line type recording head, capable of simultaneous recording over the entire width of the recording sheet, may be obtained by plural recording heads so combined as to provide the required length as disclosed in the above-mentioned patents, or may be constructed as a single integrated recording head, and the present invention can more effectively exhibit its advantages in such recording head.

The present invention is further more effective in a recording head of interchangeable chip type, which can receive ink supply from the main apparatus and can be electrically connected therewith upon mounting on said main apparatus, or a recording head of cartridge type in which an ink cartridge is integrally constructed with the recording head.

Also the recording apparatus is preferably provided with an emission recovery device and other auxiliary devices for the recording head, since the effects of the recording head of the present invention can be stabilized further. Examples of such devices for the recording head include a capping device, a cleaning device, pressurizing or suction devices, a preliminary heating device composed of electrothermal converter elements and/or another heating device, and a device for effecting an idle ink discharge independent from the recording operation, all of which are effective for achieving stable recording operation.

Furthermore, the present invention is not limited to a recording mode for recording a single main color such as black, but is extremely effective also to the recording head for recording plural different colors or full color by color mixing, wherein the recording head is either integrally constructed or is composed of plural units.

The individual components shown in outline or designated by blocks in the drawings are all well-known in the image recording and processing arts and their specific construction and operation are not critical to the operation or best mode for carrying out the invention.

While the present invention has been described with respect to what is currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A record data processing method for a recording apparatus for forming a record image based on record data transferred from a host computer by performing a plurality of main scans within a substantially same recording area using a recording head for performing dot recording, said method comprising the steps of:

dividing the record data into divided record data for use during the plurality of main scans for recording;

subjecting the divided record data to a predetermined processing for transfer to form divided processed data;

restoring the divided processed data to form divided restored data; and supplying the divided restored data to the recording head, wherein the predetermined processing for transfer comprises masking using mask patterns each comprised of a dot validation mask for validating dot recording and a dot invalidation mask for invalidating dot recording, and said restoring step comprises processing for restoring the divided processed data to form the divided restored data similar to the divided record data for use during the main scans for recording by employing templates matching the mask patterns.

2. A record data processing method according to claim 1, wherein each of the mask patterns and the templates is formed by arranging the dot validation mask and the dot invalidation mask at least in an array direction of the recording head.

3. A record data processing method according to claim 1, wherein each of the mask patterns and the templates is formed by arranging the validation mask and the invalidation mask in the form of an n-by-m matrix, where n and m are integers, in an array direction of the recording head and a main scan direction.

4. A record data processing method according to claim 1, wherein the divided processed data comprises one-half of the capacity of the divided restored data.

5. A record data processing method according to claim 1, wherein each portion of the divided record data comprises one-half of the record data.

6. A recording apparatus for use with a recording head having a recording element array for performing dot recording on a recording medium, said apparatus comprising:

main scan means for scanning the recording head in a main scan direction transverse to a direction of the recording element array;

data storage means for storing divided processed data sent from a host computer for recording;

restoration means for restoring the divided processed data stored in said storage means, the divided processed data having been divided into divided record data by the host computer and subjected by the host computer to a predetermined processing for transfer, into divided restored data for use in recording; and control means for controlling recording in a substantially same recording area of the recording medium according to the divided restored data by effecting a plurality of main scans, wherein the predetermined processing for transfer comprises masking using mask patterns each comprised of a dot validation mask for validating dot recording and a dot invalidation mask for invalidating dot recording, and said restoration means processes the divided processed data to divided restored data for use during the plurality of main scans for recording by employing templates matching the mask patterns.

7. A recording apparatus according to claim 6, wherein each of the mask patterns and the templates is formed by arranging the dot validation mask and the dot invalidation mask at least in the recording element array direction.

8. A recording apparatus according to claim 6, wherein each of the mask patterns and the templates is formed by arranging the validation mask and the invalidation mask in the form of an n-by-m matrix, where n and m are integers, in the recording element array direction and the main scan direction.

9. A recording apparatus according to claim 6, wherein the recording head comprises is an ink-jet recording head that includes a plurality of ink-jet ports and achieves dot recording by jetting ink selectively from said plurality of ink-jet ports during said main scan.

10. A recording apparatus according to claim 6, wherein the recording head comprises heat energy generation members for applying heat energy to ink to facilitate jetting of the ink.

11. A recording apparatus according to claim 6, wherein the divided processed data comprises one-half of the capacity of the divided restored data.

12. A recording apparatus according to claim 6, wherein each portion of the divided record data comprises one-half of record data divided by the host computer.

13. A recording apparatus according to claim 6, wherein said control means controls recording using all of the recording elements in the recording element array in each of the plurality of main scans to record in the substantially same recording area.

14. A recording apparatus according to claim 13, wherein a relative position between the recording head and the recording medium is shifted between each main scan of the plurality of main scans.

* * * * *

UNITED STATES PATENT AND TRADEMARK OFFICE
CERTIFICATE OF CORRECTION

PATENT NO. : 6,062,673
DATED : May 16, 2000
INVENTOR(S) : Omo et al.

Page 1 of 1

It is certified that error appears in the above-identified patent and that said Letters Patent is hereby corrected as shown below:

Column 1:
Line 44, "is," should read --was,--.

Column 2:
Line 39, "to" should read --into--.

Column 4:
Line 23, "lip" should read --11P--, and "11A" should read --11N--.

Column 6:
Line 26, "10AA" should read --10A'--.

Column 8:
Line 48, "so combined" should read --combined so--.

Column 10:
Line 39, "is" should be deleted.

Signed and Sealed this

Twenty-sixth Day of June, 2001

Attest:

NICHOLAS P. GODICI
Attesting Officer   Acting Director of the United States Patent and Trademark Office